United States Patent
Sirkett et al.

(10) Patent No.: US 9,365,359 B2
(45) Date of Patent: Jun. 14, 2016

(54) METHOD AND SYSTEM FOR FEEDING COMPONENTS

(71) Applicant: ABB Research Ltd., Zurich (CH)

(72) Inventors: Daniel Sirkett, Vasteras (SE); Arne Trangard, Vasteras (SE); Ivan Lundberg, Vasteras (SE); Ryan Mackenzie, Vasteras (SE); Andre Jaber, Bromma (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/444,595

(22) Filed: Jul. 28, 2014

(65) Prior Publication Data

US 2014/0332550 A1  Nov. 13, 2014

Related U.S. Application Data

(63) Continuation of application No. PCT/EP2012/051502, filed on Jan. 31, 2012.

(51) Int. Cl.
*B65G 47/24* (2006.01)
*B65G 47/19* (2006.01)
*B65G 47/14* (2006.01)

(52) U.S. Cl.
CPC ............ *B65G 47/19* (2013.01); *B65G 47/1478* (2013.01)

(58) Field of Classification Search
CPC ........... B65G 47/1442; B65G 47/1414; B65G 47/1407; B65G 47/1492; B65G 2203/041
USPC ........ 198/396, 443, 444, 774.3; 221/171, 292
See application file for complete search history.

(56) References Cited

U.S. PATENT DOCUMENTS

| | | | |
|---|---|---|---|
| 2,767,536 A | | 10/1956 | Forkel |
| 2,954,862 A | * | 10/1960 | Clark ............................ 198/443 |
| 5,314,055 A | * | 5/1994 | Gordon ......................... 198/395 |
| 5,687,831 A | | 11/1997 | Carlisle |
| 6,135,263 A | * | 10/2000 | Williams ....................... 198/396 |
| 6,257,395 B1 | * | 7/2001 | Yokajty et al. ................ 198/580 |
| 6,789,661 B2 | | 9/2004 | Davies et al. |
| 7,028,829 B2 | | 4/2006 | Buchi |
| 8,967,365 B2 | * | 3/2015 | Sirkett et al. .................. 198/396 |
| 2001/0050207 A1 | * | 12/2001 | Kearney ........................ 198/396 |
| 2003/0042112 A1 | * | 3/2003 | Woerner et al. ............... 198/446 |

FOREIGN PATENT DOCUMENTS

| | | |
|---|---|---|
| DE | 3503102 A1 | 8/1985 |
| DE | 4437162 A1 | 4/1996 |
| DE | 10126188 A1 | 12/2002 |
| EP | 1911698 A2 | 4/2008 |
| FR | 2897594 A1 | 8/2007 |
| WO | 8807015 A1 | 9/1988 |
| WO | 8902865 A1 | 4/1989 |

OTHER PUBLICATIONS

International Search Report and Written Opinion of the International Searching Authority Application No. PCT/EP2012/051502 Completed: Oct. 8, 2012; Mailing Date: Oct. 31, 2012 8 pages.

\* cited by examiner

*Primary Examiner* — James R Bidwell
(74) *Attorney, Agent, or Firm* — Whitmyer IP Group LLC

(57) ABSTRACT

A component feeder including a lift for elevating a selection of components from a bulk storage, and a pick surface adjacent to the lift for receiving the selection of components. A spreader gives the selection of components a push for spreading the selection of components from the lift on the pick surface. The combination of a vertical lift and a separate pick surface adjacent to the lift enables the bulk storage being positioned right below the pick surface. The area of the pick surface is large in relation to the total footprint of the component feeder.

12 Claims, 5 Drawing Sheets

METHOD AND SYSTEM FOR FEEDING COMPONENTS

FIELD OF THE INVENTION

The present invention relates to a device for feeding components from a bulk storage.

BACKGROUND OF THE INVENTION

Feeding individual components from a disordered bulk storage is a common task in automated industrial systems. Feeding devices using many different principles and in different embodiments are known for specific feeding tasks. One common type of component feeder is a vibratory bowl feeder which uses a vibratory movement to advance, orient and sort the components. Typical for vibratory bowl feeders and for many other types of feeders is that they need to be customized for a specific component. At the feeder outlet the components are arranged in a well-defined position and orientation for further processing. A feeder using a rotating disc for advancing components to pass an orientation filter is disclosed in WO89/02865. The feeder according to WO89/02865 further discloses a lift for selecting a number of components from a bulk storage. An upper surface of the lift is inclined such that gravity causes the components to glide on the rotating disc.

Flexible feeders exist which are not limited to a certain component but can handle a variety of different components. Such feeders typically use a vision system for recognizing the components, and a robot for picking up the recognized components. One such flexible feeder is known from U.S. Pat. No. 5,687,831 wherein a set of conveyors is used to spread the components appropriately on a pick surface from where a gripper can pick them up after being recognized by a vision system. The feeder according to U.S. Pat. No. 5,687,831 is complicated especially because specific transport means are required for returning the remaining components back to the bulk storage. Moreover, as the bulk storage needs to be horizontally displaced in relation to the pick surface, the pick surface area is small in comparison to the total footprint of the feeder. U.S. Pat. No. 7,028,829 provides a similar solution with similar problems.

DE10126188 discloses another type of flexible feeder which uses a lift to select a number of components from a bulk storage. A lift platform on which the components are resting is then vibrated or rotated to spread the components such that they can be easily recognized by a vision system and picked by a manipulator. The area of the lift platform needs to be relatively small in relation to the total footprint of the feeder, and consequently the pick surface area is also small. In order for the components to be well-spread many of them need to be returned back to the bulk storage, which leads to an undesired wear of the components to be fed.

SUMMARY OF THE INVENTION

One object of the invention is to provide an improved flexible feeder which mitigates the shortcomings of the flexible feeders known in the art i.e. large footprint and wear of the components to be fed.

A further object of the invention is to provide an improved method for feeding components.

These objects are achieved by the device for elevating a selection of components from a bulk storage and the method for feeding components.

According to a first aspect of the invention, there is provided a component feeder comprising a lift for elevating a selection of components from a bulk storage, and a pick surface adjacent to the lift for receiving the selection of components. The component feeder comprises a spreader configured to give the selection of components a push for spreading the selection of components from the lift on the pick surface.

The combination of a vertical lift and a separate pick surface adjacent to the lift enables the bulk storage being positioned directly below the pick surface. Consequently, the area of the pick surface becomes large in relation to the total footprint of the component feeder. All the lifted components can be spread out without returning any of them to the bulk storage, and the remaining components may be returned to the bulk storage simply by retracting or inclining the pick surface.

According to one embodiment of the invention the component feeder further comprises retracting means for retracting the pick surface and returning any components lying on it back to the bulk storage. A retractable pick surface provides a simple means for returning components remaining on the pick surface back to the bulk storage.

According to one embodiment of the invention the retracting means comprises a capstan for furling the pick surface. A capstan provides a simple means for retracting the pick surface.

According to one embodiment of the invention the lift comprises a lift platform for supporting the selection of components, and the component feeder further comprises a lift adjuster for adjusting the lift platform area. An adjustable lift platform area enables an appropriate number of well-spread components to be achieved with variable component sizes.

According to one embodiment of the invention the component feeder further comprises vibration means for causing the pick surface to vibrate and reorient the selection of components. A vibrating pick surface further contributes on the spreading of the components.

According to a second aspect of the invention, there is provided a component feeder system comprising two component feeders according to any of the embodiments described hereinbefore, wherein a single camera is configured to monitor the two pick surfaces. By this measure, an outlay on the vision system used in tandem with the component feeders is minimized.

According to a third aspect of the invention, there is provided a method for feeding components, the method comprising the steps of: lifting a selection of components from a bulk storage by means of a lift; and giving the selection of components a push to spread the same from the lift on a pick surface adjacent to the lift.

The combination of lifting and spreading on a separate pick surface enables all the lifted components to be well-spread without returning any of them to the bulk storage.

Further advantageous embodiments of the method are the subject of the dependent claims.

BRIEF DESCRIPTION OF THE DRAWINGS

The invention will be explained in greater detail with reference to the accompanying drawings, wherein

FIGS. 3A-I illustrate a work cycle of a component feeder according to one embodiment of the invention;

DETAILED DESCRIPTION OF THE INVENTION

Figure 1:
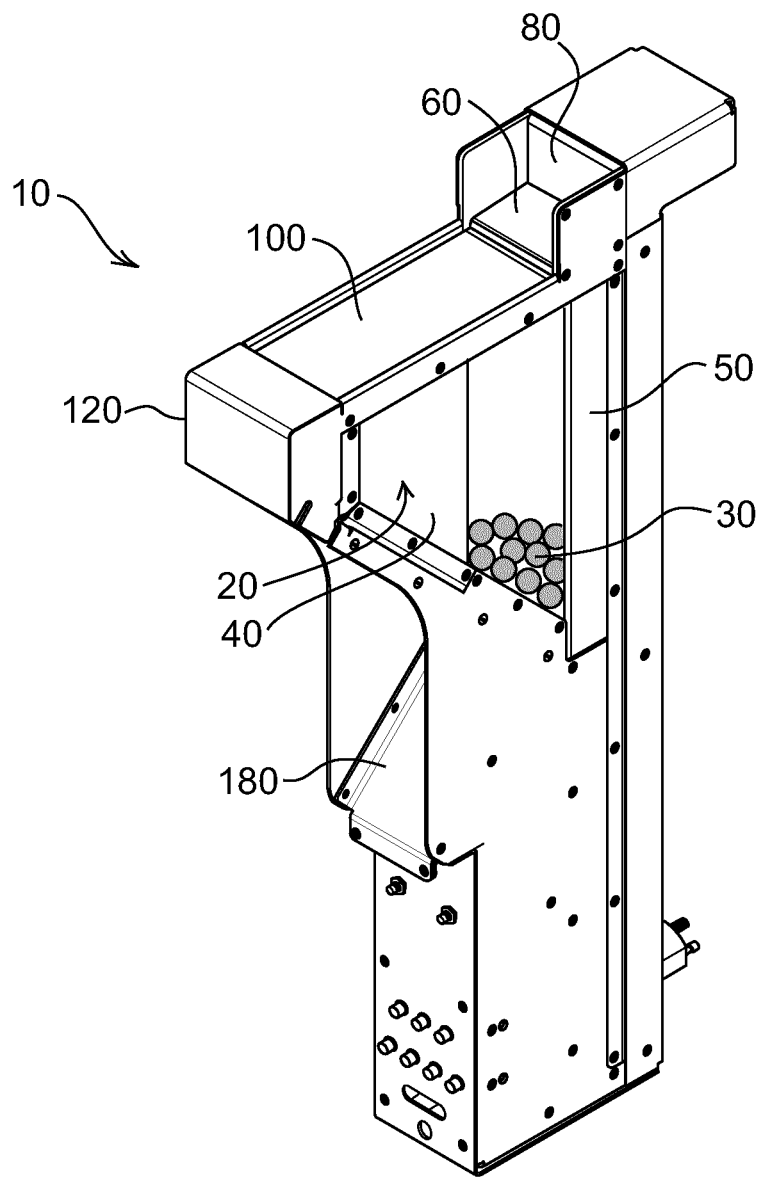
FIG. 1 shows a component feeder according to one embodiment of the invention in isometric view.
Figure 2:
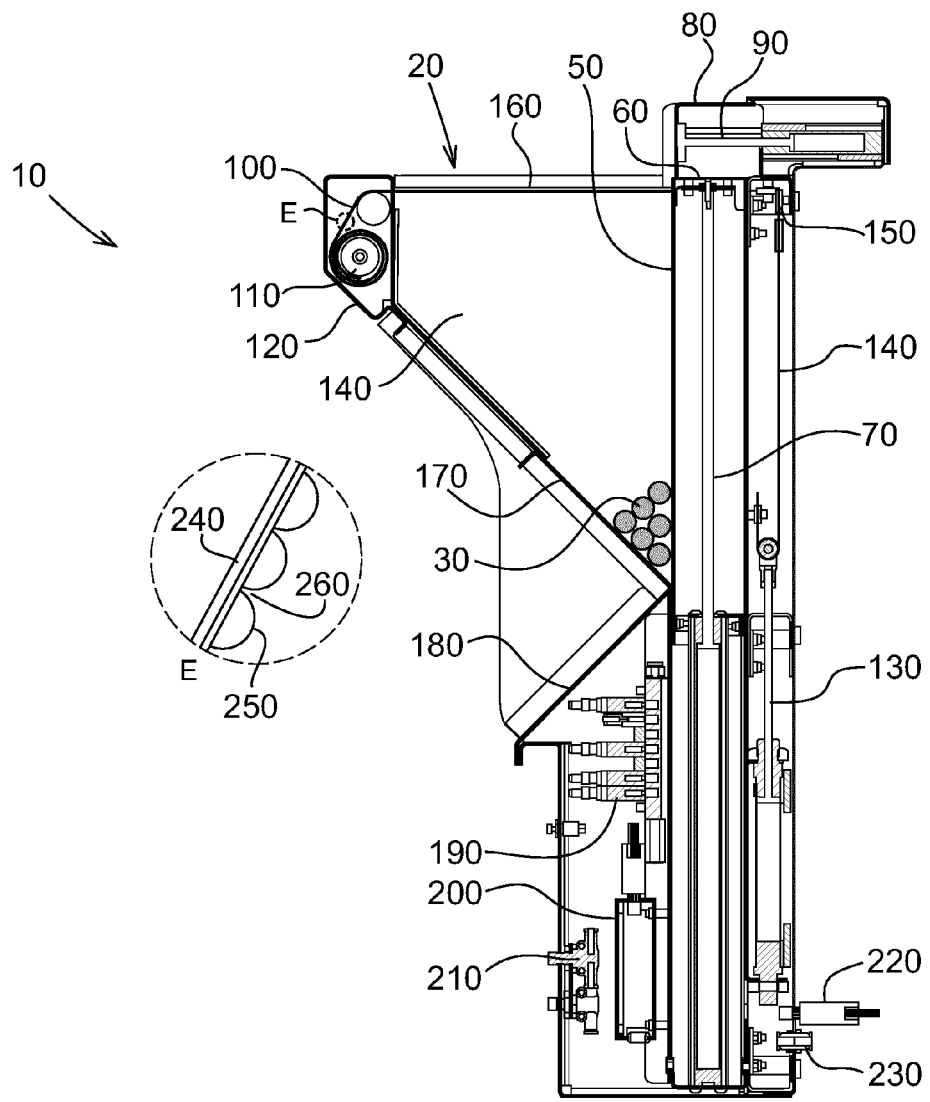
FIG. 2 shows a cross-section of a component feeder according to one embodiment of the invention.

Referring to FIGS. 1 and 2, one embodiment of a component feeder 10 according to the invention comprises a triangular hopper 20 for receiving a bulk storage of components 30 to be fed. The side walls 40 of the hopper 20 are transparent. At the rear of the hopper 20 there is provided a vertically acting lift 50 with a horizontal lift platform 60 for supporting the components 30. The lift 50 is operated by a first pneumatically operated piston 70 mounted under the lift platform 60. In the upper rear corner of the component feeder 10 there is provided a horizontally acting spreader in the form of a pusher plate 80 which is driven by a second pneumatically operated piston 90. A retractable pick surface 100 covers the bulk storage completely in its unfurled state shown in FIG. 1. In a furled state shown in FIG. 2 the pick surface 100 is stored coiled around a spring driven capstan 110 in a pick surface compartment 120 in the upper front region of the component feeder 10. Unfurling is effected by a third pneumatically operated piston 130 whose movement is transmitted by a flexible cord 140 passing over pullies 150. During furling and unfurling the pick surface 100 glides in grooves 160 provided at the side walls 40 of the hopper 20.

Situated in the oblique surface of the triangular hopper 20 there is a sliding door 170 which is opened and closed manually. The sliding door 170 opens and closes an emptying aperture which leads onto a chute 180 that guides the components 30 running out when the hopper 20 is emptied. In a compartment under the chute 180 there are located solenoid valves 190, a control electronics housing 200 and a bank of flow control valves 210. At the lower rear region of the component feeder 10 there are situated electrical 220 and pneumatic 230 connections.

The construction of the pick surface 100 is now described with reference to FIG. 2, detail "E". The pick surface 100 is white in colour to provide good contrast for the vision system, and is provided with a flocked coating 240 consisting of short, densely packed vertically oriented fibres. The purpose of this is to reduce the time taken for the parts to settle by damping out rolling and bouncing motions. To the underside of the pick surface 100 there are bonded transverse beams 250 of semi-circular cross-section. These beams 250 may be made from carbon fibre or another rigid material and serve to stiffen the pick surface 100 over its width to prevent the weight of parts causing it to bulge inwards. A small gap 260 is left between adjacent beams to provide the flexibility necessary for furling and unfurling.

The operation of the component feeder 10 is explained with reference to FIGS. 3a-3i. At starting position according to FIG. 3a, all the pistons 70, 90, 130 assume fully extracted positions. Components 30 are introduced from above through a filling aperture at the top of the hopper 20. Upon receiving a command from a robot which the component feeder 10 is intended to serve, the sequence of actions is as follows: At step one according to FIG. 3b the lift 50 is drawn down to its lowermost position and simultaneously the pusher plate 80 is withdrawn to its rearmost position flush with the rear wall of the hopper 20. At step two according to FIG. 3c the lift 50 moves back to the top, bringing with it a first selection of components 30 which settle on the lift platform 60. At step three according to FIG. 3d a lift adjuster in the form of the pusher plate 80 advances slowly to a predetermined position partway along its stroke, thereby reducing the lift platform area and pushing some components 30 back to the bulk storage such that a second selection of components 30 remains on the lift platform 60. At step four according to FIG. 3e the pusher plate 80 retreats once more to its rearward end position.

The steps three and four are optional and can be omitted if the amount of components 30 in the first selection of components 30 is appropriate. The avoidance of steps three and four is desirable since it shortens the cycle time of the component feeder 10 and contributes to reduced wear of the components 30. The lift adjuster therefore preferably comprises means to adjust the lift platform area before step two, for example by making the lift platform 60 interchangeable for different types of components 30.

Figure 3A:
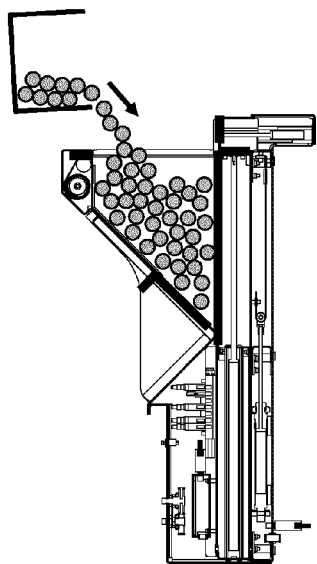
Figure 3B:
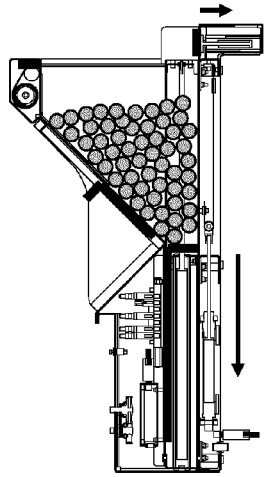
Figure 3C:
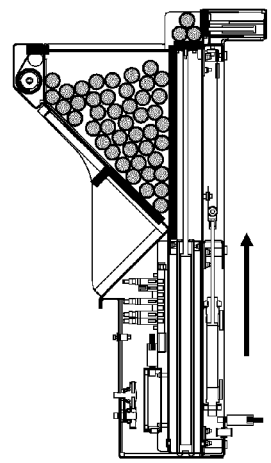
Figure 3D:
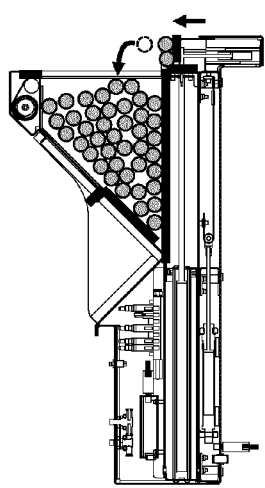
Figure 3E:
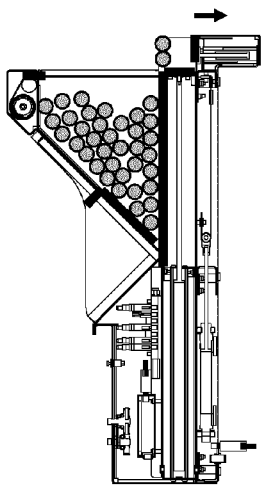
Figure 3F:
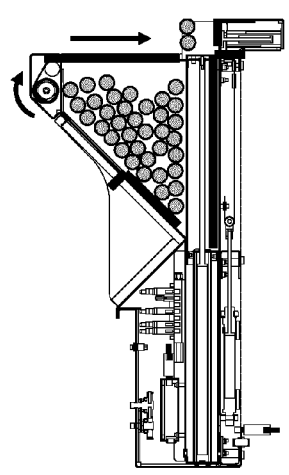

At step five according to FIG. 3f the third piston 130 retracts causing the pick surface 100 to unfurl and cover completely the filling aperture. At step six according to FIG. 3g the pusher plate 80 gives the selection of components 30 a push to thereby spread the components 30 out on the pick surface 100. The push is effected by the second piston 90 which extracts at a high speed. That is, in the present embodiment the pusher plate 80 functions both as a lift adjuster and as a spreader. However, other types of spreaders can be adopted, such as a blow gun blowing compressed air at the selection of components 30.

Once the selection of components 30 is at rest on the pick surface 100, a camera 270 (see FIG. 5) mounted directly above the pick surface 100 takes a picture of the selection of components 30. Image processing software identifies the silhouettes of any components 30 that happen to lie in a desired orientation, and at step seven according to FIG. 3h a robot gripper 280 picks up all the respective components 30. At step eight according to FIG. 3i the third piston 130 extracts, whereupon the pick surface 100 is coiled back around its capstan 110. Any parts eventually remaining on the pick surface 100 after step seven fall back to the bulk storage once the pick surface 100 is fully withdrawn into the pick surface compartment 120.

After step eight the state of the component feeder 10 corresponds to the starting position and the cycle may be repeated starting from step one. A typical cycle duration is of the order of 2-5 seconds. The cycle described hereinbefore can be modified in many ways to improve the feeding performance. For example, the steps one and two may be taken already while the robot gripper 280 picks the components 30 at step seven in order to shorten the cycle time.

Figure 4:
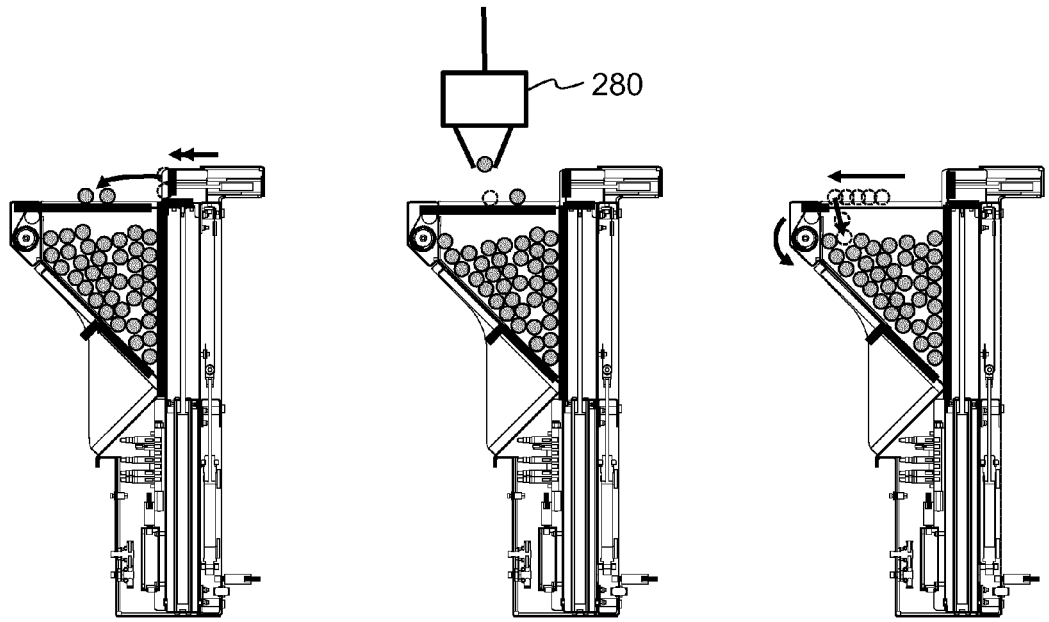
FIG. 4 illustrates emptying of a component feeder according to one embodiment of the invention.
Figure 4:
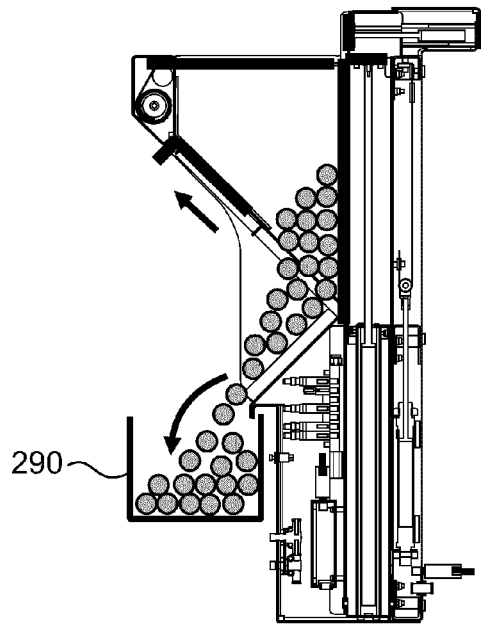

The cycle according to steps one to eight may continue until the level of components 30 in the hopper 20 falls below a minimum threshold, as determined by e.g. a level sensor (not shown). At this point, the cycle is paused until the hopper 20 is re-filled and the operation can be resumed. Referring to FIG. 4, should it be necessary to empty the hopper 20 e.g. for component changeover, the sliding door 170 can be opened and the entire contents of the hopper 20 fall by gravity through the emptying aperture into a waiting receptacle 290. To ensure no components 30 are left behind, a sensor (not shown) detects the opening of the sliding door 170 and triggers all the pistons 70, 90, 130 to extract such that the component feeder 10 assumes the state corresponding to the starting position according to FIG. 3a.

Component changeover requires only two manual adjustments: the partial stroke of the pusher plate 80 at step three and the speed of the pusher plate 80 at step six must be adjusted such that an appropriate number of well-spread components 30 land within the view area of the vision system.

In the description of the component feeder 10 thus far presented, if no components 30 are lying in the correct orientation, the component feeder 10 simply tries again, repeating the cycle until a pickable component arises. However, depending upon the type of component and its friction coefficient against the pick surface 100, the component feeder 10 may also be capable of reorienting components 30 to a limited degree. This may be achieved by a vibrating movement of the pick surface 100.

Figure 5:
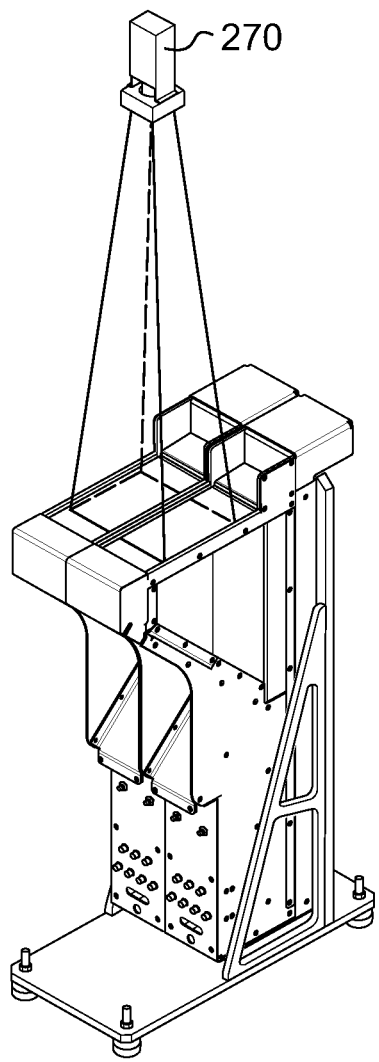
FIG. 5 shows a component feeder system according to one embodiment of the invention.

To minimize outlay on the vision system used in tandem with the component feeder 10, it is desirable to use as few cameras 270 as possible. Here, the presently invented component feeder 10 offers another advantage over existing solutions. Referring to FIG. 5, a small waste footprint in lateral direction allows the pick surfaces 100 of two component feeders 10 arranged side-by-side to be separated by only 10 mm, which in its turn allows a single camera 270 to monitor two pick surfaces 100. A single camera 270 equipped with a 25 mm lens and positioned 630 mm overhead can cover around 18000 $mm^2$ of pick surface area or 94% of the area encompassed by the view area.

The invention is not limited to the embodiments shown above, but the person skilled in the art may, of course, modify them in a plurality of ways within the scope of the invention as defined by the claims.

What is claimed is:

1. A component feeder configured to execute work cycles, the component feeder comprising:
    a lift configured to elevate, once per work cycle, a selection of components from a bulk storage;
    a pick surface adjacent to the lift, the pick surface configured to receive, once per work cycle, at least a portion of the selection of components; and
    a spreader configured to give, once per work cycle, the selection of components a first push in order to spread a first portion of the selection of components from the lift back into the bulk storage, and a second push in order to push a second portion of the selection of components remaining on the lift onto the pick surface.

2. The component feeder according to claim 1, further comprising a retracting device configured to retract the pick surface and permit the return of any components lying on the pick surface back to the bulk storage.

3. The component feeder according to claim 2, wherein the retracting device comprises a capstan configured to furl the pick surface.

4. The component feeder according to claim 1, wherein the lift comprises a lift platform configured to support the selection of components, and the component feeder further comprises a lift adjuster configured to adjust the lift platform area.

5. The component feeder according to claim 1, further comprising a vibration device configured to cause the pick surface to vibrate and reorient any components lying on the pick surface.

6. A component feeder system comprising two component feeders according to claim 1, wherein a single camera is configured to monitor the two pick surfaces.

7. The component feed of claim 1, further comprising a retracting device configured to retract the pick surface and permit the first portion of the selection of components to be pushed from the lift back into the bulk storage as a result of the first push of the spreader.

8. The component feed of claim 1, wherein the spreader includes a piston and a pusher plate disposed at an end of the piston; and
    wherein the piston is configured to move the pusher plate to a first predetermined position partway along a piston stroke in order to provide the first push of the spreader, and the piston is configured to move the pusher plate to a second predetermined position at an end of the piston stroke in order to provide the second push of the spreader.

9. A method for feeding components in work cycles, the method comprising the steps of:
    lifting, once per work cycle, a selection of components from a bulk storage using a lift; and
    giving, once per work cycle, the selection of components a first push to spread a first portion of the selection of components from the lift back into the bulk storage, and a second push in order to push a second portion of the selection of components remaining on the lift onto a pick surface adjacent to the lift.

10. The method according to claim 9, further comprising the step of:
    retracting the pick surface to permit the return of any components lying on the pick surface back to the bulk storage.

11. The method according to claim 9, further comprising the step of:
    adjusting an area of a lift platform in order to select an appropriate amount of components.

12. The method according to claim 9, further comprising the step of:
    vibrating the pick surface in order to reorient any components lying on the pick surface.

* * * * *